May 16, 1939.  H. G. SHAKESPEARE  2,158,838
CONNECTING LINK
Filed June 21, 1937
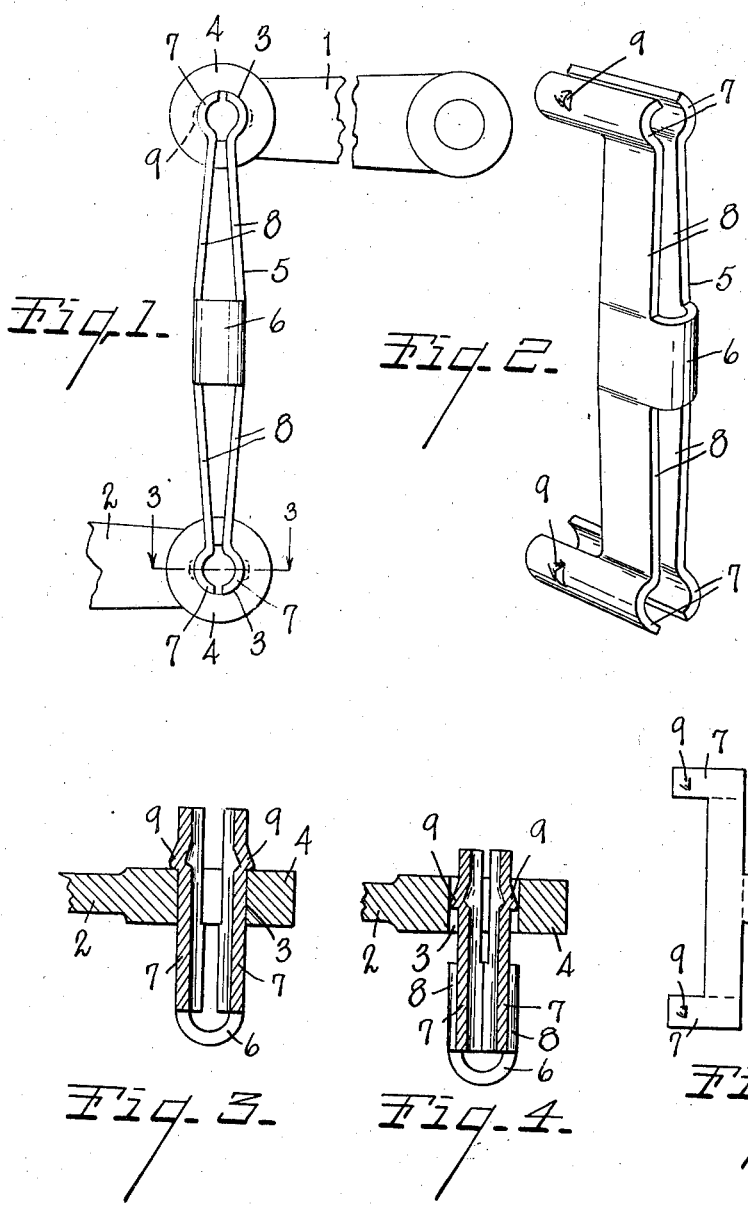
INVENTOR.
Henry G. Shakespeare
BY Earl & Chappell
ATTORNEYS Patented May 16, 1939

2,158,838

UNITED STATES PATENT OFFICE 2,158,838

CONNECTING LINK

Henry G. Shakespeare, Kalamazoo, Mich., assignor to Shakespeare Products Company, Kalamazoo, Mich.

Application June 21, 1937, Serial No. 149,448

9 Claims. (Cl. 74—588)

This invention relates to improvements in connecting links.

The main objects of this invention are:

First, to provide a coupling element or connecting link well adapted for assembly with a coacting pair of elements for connecting the same.

Second, to provide a coupling element having these advantages which is non-rattling and therefore particularly well adapted for use in connecting automobile parts such as a pair of switch levers or the like.

Third, to provide a coupling element of the type described which is very simple and economical in construction and at the same time strong and durable.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary view in elevation illustrating my improved coupling member in assembled relation to a pair of crank arms which it is desired to articulate.

Fig. 2 is a perspective view of my improved coupling member in a preferred embodiment thereof.

Fig. 3 is an enlarged detail section on line 3—3 of Fig. 1.

Fig. 4 is a view similar to Fig. 3 illustrating the manner of assembling and removing or disengaging my improved coupling element with an associated part.

Fig. 5 is a view illustrating the blank from which the coupling element shown in Fig. 2 is formed.

My invention relates to coupling elements or links and finds a wide application in connecting various cranks, levers and linkages in automobile mechanisms or controls, for instance. The structure is extremely simple and may be easily manufactured and very quickly and easily assembled with the parts which it is to couple and with which it is associated.

In the preferred embodiment illustrated the element is formed from a sheet metal blank of general H shape by a few simple bending operations and is brought to its final form without the necessity for expensive machining steps. With regard to the feature of ease of assembly, it is merely necessary to compress the resilient pivot members or force them toward each other and insert them in openings or bearings of the parts to be connected. The device is also non-rattling which is a feature of very substantial merit.

Referring to the drawing, the reference numerals 1 and 2 indicate a pair of pivotally mounted lever or crank arms which it is desired to couple. In the levers illustrated each is provided with a bore or pivot opening 3 in the boss or enlargement 4 thereof.

The structure of Fig. 5, which illustrates a sheet metal blank in the general form of the letter H, consists of a pair of opposed members 5 joined by a cross piece 6. These arms terminate in the transversely extending pivot members 7. In forming the coupling element or link from the blank the connecting cross piece 6 is bent to bring the members 5 into opposed parallel relation, thus providing a pair of opposed spring arms 8, 8 having the laterally projecting pivots 7 at the ends thereof.

Before this bending operation is performed the pivot portions of the arms are conformed to provide cylindrical surfaces or are cylindrically curved, the members coacting to provide pivots which may be engaged with the pivot openings 3 of the levers or other elements to be connected.

As illustrated in the accompanying drawing, these pivot members have retaining lugs 9 struck out therefrom serving to retain the pivots in engagement with the part with which the coupling is associated. In assembling the spring arms are pressed toward each other to allow the pivot members to be inserted through the opening 3 in the member to be coupled and allowed to spring out under the tension of the spring arms, the lugs preventing withdrawal of the pivots. This avoids the necessity for using a cotter pin or other pin, and the device is free from rattle. It also avoids the use of additional means for preventing rattle.

The structure as illustrated in the drawing is shown in an operating connection such as for operating switches. However, it has a wide range of adaptation and utility.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A coupling element comprising a pair of opposed spring members joined centrally at one edge thereof by an integral bowed cross member providing opposed pairs of spring arms normally supported in spaced relation, said arms terminating in laterally projecting cylindrically curved opposed pivot members, said pivot members having retaining lugs struck out therefrom adjacent their outer ends.

2. A coupling element comprising a pair of opposed spring members joined centrally at one edge thereof by an integral bowed cross member providing opposed pairs of spring arms normally supported in spaced relation, said arms terminating in laterally projecting pivot members.

3. An element of the class described comprising elongated spring members joined at one side with reference to the length thereof to provide normally spaced spring arms, said arms being provided with opposed curved pivot members disposed transversely of the arms and provided with retaining lugs, the arms being adapted to be compressed toward each other to permit the insertion of the pivot members in an opening of a coacting member, the lugs retaining the pivot members in said opening.

4. An element of the class described comprising opposed spring members, a cross member extending between said spring members transverse the length thereof and joined to said spring members intermediate their ends, said cross member being bent to space said spring members laterally and provide spring arms, said arms being provided with curved pivot surfaces.

5. A coupling element comprising a pair of opposed spring members joined at one edge thereof by an integral cross member providing a pair of opposed normally spaced spring arms, said arms being provided with integral laterally projecting cylindrically curved opposed pivot members, said pivot members having retaining lugs struck out therefrom.

6. A coupling element comprising a pair of opposed elongated spring members lying in parallel planes and joined at one side edge with reference to the length thereof by an integral cross member, said cross member being disposed transversely of the planes of the spring members to provide a pair of opposed normally spaced spring arms, said arms being provided with laterally projecting opposed members having curved pivot surfaces.

7. A connecting link comprising a pair of arms and a cross strap integrally joined to the arms and connecting the same, said arms terminating at each end in transversely disposed pivot members, said strap being bent parallel to the length of the arms to support said arms substantially parallel with pairs of said pivot members disposed in spaced spring relation to one another, whereby the said pairs may be compressed, inserted in the pivot bearings of a pair of elements desired to be linked together and allowed to expand, said link having means serving to maintain the members in inserted operative position and prevent accidental displacement thereof.

8. A connecting link comprising a pair of arms and a cross strap joined to the arms and connecting the same, said arms terminating at each end in transversely disposed pivot members, said strap being bent parallel to the length of the arms to support said pivot members in spaced spring relation to one another, whereby the said arms may be compressed, and the pivot members inserted in the pivot bearings of a pair of elements desired to be linked together and allowed to expand, said link having means serving to maintain the members in inserted operative position and prevent accidental displacement thereof.

9. A connecting link comprising a pair of arms and a cross strap joined to the arms and connecting the same, said arms terminating at each end in transversely disposed pivot members, said strap being bent parallel to the length of the arms to support said pivot members in spaced relation to one another, whereby the said pairs may be compressed, inserted in the pivot bearings of a pair of elements desired to be linked together and allowed to expand.

HENRY G. SHAKESPEARE.